United States Patent [19]
DeSorgo et al.

[11] 3,875,067
[45] Apr. 1, 1975

[54] PHOTOPOLYMERIZATION APPARATUS

[75] Inventors: Miksa DeSorgo, Olmsted; Vincent D. McGinniss, Middleburgh Heights, both of Ohio

[73] Assignee: SCM Corporation, Cleveland, Ohio

[22] Filed: June 25, 1973

[21] Appl. No.: 373,374

[52] U.S. Cl. ............................................. 250/527
[51] Int. Cl. ................................................ B01j 1/10
[58] Field of Search ................. 250/527; 204/159.22

[56] References Cited
UNITED STATES PATENTS

| | | | |
|---|---|---|---|
| 3,666,645 | 5/1972 | Ransohoff | 204/193 |
| 3,782,951 | 1/1974 | Lee | 204/159.22 |

*Primary Examiner*—Howard S. Williams
*Attorney, Agent, or Firm*—Thomas M. Schmitz

[57] ABSTRACT

Process and apparatus for polymerizing oxygen-inhibited ultraviolet photopolymerizable resin-forming material such as a film is shown. The apparatus comprises a pair of U.V. light sources, one being a flash photolysis source, the other a sustained photolysis source, both disposed for irradiating said mass as it abides in an atmosphere such as air which tends to inhibit such polymerization. The process has two essential phases, a superficial phase and a profound phase, performed simultaneously or one in advance of and as preparation for the other. The profound phase is performed with sustained irradiation effective for substantially completely polymerizing said material except for inhibition of polymerization at the surface thereof due to said atmosphere. The superficial phase is performed with flash irradiation effective for forming a tack-free skin over said material. Said skin helps to protect the less fully polymerized material therebelow from oxygen inhibition when such superficial phase is performed first or simultaneously with the other phase. When such superficial phase is performed after the profound phase, said superficial phase acts to complete polymerization of said material throughout its thickness.

4 Claims, 1 Drawing Figure

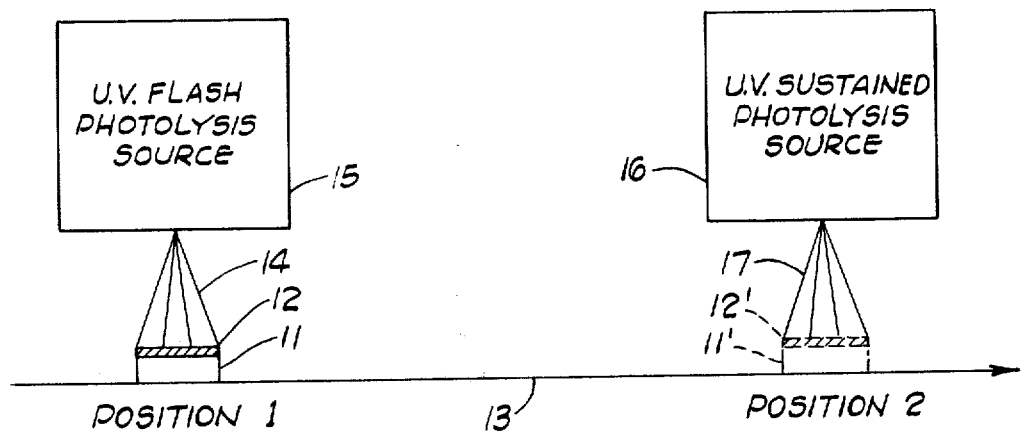

PHOTOPOLYMERIZATION APPARATUS

BACKGROUND OF THE INVENTION

This invention relates to process and apparatus for polymerizing oxygen-inhibited ultraviolet photopolymerizable resinforming material such as a film or a deposit thereof on a substrate. For convenience herein such masses of the resin-forming material will be referred to from time to time simply as "films."

Superficial curing herein connotes polymerization of the binding vehicle in such film to convert the surface of the film from a liquid or tacky condition into a tack-free condition, detectable by touch; full curing connotes substantially complete polymerization of the film throughout its thickness to a finished state. Films that undercured often have poor adhesion to substrates. Films with mainly a superficial cure (and somewhat undercured therebelow) frequently will develop defects such as wrinkling, "orangepeeling," or "alligatoring." Films that are well cured below, but which have a tacky or undercured surface, are generally unusable because of such tacky or undercured and thus unsatisfactory condition.

The generally advantageous ultraviolet wave energy useful for the instant process is that U.V. energy in the so-called "near-visible" or "near-U.V." region, in other words, the wavelengths of the U.V. spectrum that are transmittable through a quartz or other transparent window. Such advantageous range should be understood herein as lying between about 1,600–1,800 A wavelength and about 4,000–4,200 A wavelength, and preferably between about 2,500 A and 4,000 A wavelength.

Conventionally convection ovens and infrared sources have been used to cure (polymerize) films in the nature of a paint, varnish, enamel, lacquer, stain, filler, ink, or adhesive. The instant film or deposit can be a clear one, optionally tinted, or an opaque one, either kind in a variety of colors for the purpose of protecting, decorating, and/or applying a message on a substrate, or for adhesively uniting a plurality of U.V. light-transmitting layers one with another. For convenience herein the film or deposit for such curing, whether it is virtually totally polymerizable, such as a binding-type vehicle by itself, or such vehicle compounded with other ingredients such as pigments and fillers, will be referred to herein from time to time as a "paint." Such "paint" can be a fluent, liquid phase continuous material, a jelly like material, or a powdery mixture. It can have, if desired, opacifying pigment and/or added colorants and fillers in conjunction with such polymerizable binding vehicle. Such paint also can have various other conventional additives such as pesticides, odorants, flow-control agents, bubble breakers, defoamers, plasticizers, intercoat adhesion promoters, and other ingredients conventional in surface-coating films and adhesives.

More recently ultraviolet wave energy curing of materials has been suggested, usually using various U.V. sensitizers for sensitizing photopolymerization in ultraviolet wavelengths in the near-visible region. The literature on such photopolymerization and sensitization is abundant. Films (deposits) of paint for such U.V. curing can be quite thin, e.g., 0.1 mil or less, often are 0.5-2 mils in thickness, and can be as high as 50 or 60 mils, although heretofore such extremely thick films have often been difficult to cure. For the purpose of this specification, films (including deposits) can be continuous or discontinuous upwards to the thickness of 75 mils.

A fairly intense radiation source which emits a minor proportion of its radiation in the near-U.V. region is shown in U.S. Pat. Nos. 3,364,387 and 3,650,669; the latter patent teaches the curing of paint films by exposure to such radiation. This sustained source of U.V. energy is conveniently described as a plasma arc torch operating at essentially atmospheric pressure. It usually operates with a swirl flow. The intensity of such torch integrated throughout the entire spectrum range of its continuum light radiation can be at least about 350 watts per square centimeter steradian. Ordinarily, such apparatus is used with an inert gas atmosphere blanketing the coated workpiece to be irradiated so as to prevent inhibition of polymerization from air.

Electric lamps and lasers have been made to emit sustained U.V. radiation also for such curing purpose. An example of laser application to the cure of U.V.-polymerizable materials is in the copending U.S. patent application of Antonio de Souza and A. M. Buhoveckey, U.S. Ser. No. 189,254, filed Oct. 14, 1971. Other examples of U.V. laser and U.V. electric lamp curing of such materials are shown in U.S. Ser. No. 342,038 of Antonio de Souza, filed Mar. 16, 1973.

Commercial electric U.V. lamps for this sustained curing purpose are shown, for example, in U.S. Pat. Nos. 3,499,781 and 3,673,140. Such commercial lamps are usually referred to as "mercury U.V. lamps" even though they can have gases mixed with the mercury which modify the emanations. They ordinarily have medium filling pressure. U.V. light sources for flash photolysis also can be conventional and devised on principles related to the sustained electrical U.V. photolysis light sources except that they are controlled to emit short bursts or flashes of energy interrupted by down time. A typical flash photolysis source is shown in West German Pat. No. 2,019,270 of Nov. 16, 1972. The subject matter of these patents and all the patent applications cited herein is expressly incorporated herein by reference.

Molecular oxygen in the atmosphere surrounding the film usually is inhibitory to the full curing of otherwise U.V.-photopolymerizable resin-forming masses. In such instance often the surface in contact with such atmosphere remains undercured. Additionally, any ozone present is especially so inhibiting. Hence the masses to be cured usually are protected from air atmosphere with nitrogen or other inert blanketing gas at considerable expense and trouble. Such inhibiting atmosphere also can be substantially more or less rich in molecular oxygen than air is and still be quite inhibitory to satisfactory curing of the film or deposit.

Advantages of U.V. curing over other conventional curing in ovens or the like include especially the ability of the U.V. irradiation to perform "cold" polymerization ("curing") of the film at high speed with attendant suppression of losses due to volatilization of components of the film, suppression of discoloration or degradation of the film, suppression of shrinkage and distortion of the film and of the substrate (preservation of dimensional stability), and suppression of degradation of the substrate to which the film is applied, particularly when such substrate is plastic, paper, or fabric.

Special advantages of the instant invention include effective U.V. curing of the films or deposits in economical atmospheres such as air, a lessened cooling load on the individual U.V. light sources of the apparatus, and the ability to distribute such load over a plurality of U.V. light sources. The sustained operation of U.V. lamps at about their highest intensity often overheats them and causes production slowdowns. This invention permits, in many cases, beneficial reduction of energy intensity from the sustained irradiating U.V. light source or sources used according to invention principles.

SUMMARY OF THE INVENTION

The instant improvement in a process for polymerizing an oxygen-inhibited ultraviolet photopolymerizable resin-forming material by exposing a surface thereof to U.V. radiation comprises:

subjecting the exposed surface of said material to superficial polymerization initiated by a flash of U.V. energy effective for forming a tack-free skin over said mass during, prior to, or subsequent to photopolymerizing the balance of the material below said exposed surface by sustained U.V. irradiation.

Imaging reflectors can be used to direct both the superficial and the sustained U.V. irradiation onto the same surface area for simultaneous performance of both phases. Alternatively, and preferably for greater flexibility in the process, the sustained phase and the superficial phase can be conducted as follows:

staging said polymerization process as two essential phases, specifically a superficial phase and a profound phase, and performing one of said phases in advance of and as preparation for the other with both in the ambience of atmosphere containing polymerization-inhibiting oxygen, said profound phase being performed with sustained irradiation by said U.V. energy effective for substantially completely polymerizing said mass except for inhibition of polymerization at the surface thereof due to said oxygen, said superficial phase being performed with a flash of said U.V. energy effective for forming a tack-free skin over said mass and, in so doing, either
  a. improving protection of the less fully polymerized resin-forming material therebelow from polymerization inhibition due to said oxygen when said superficial phase is the first one to be performed, or
  b. substantially completing polymerization of said mass throughout its thickness when said superficial phase is the second one to be performed.

The instant apparatus for polymerizing such resin-forming material by so irradiating it comprises a pair of light sources providing said U.V. energy, one of said pair being a flash photolysis light source, the other of said pair being a sustained photolysis light source, both of said sources being disposed for irradiating said mass simultaneously or sequentially as it abides in an atmosphere containing polymerization-inhibiting oxygen.

The kind of polymerizable vehicle in the film will affect the intensity useful for curing the film rapidly, as well as will the thickness of such film, kind and proportion of pigmentation and/or dye in the film, the gaseous atmosphere around the film, the type of sensitizers or other polymerization activators and their proportion in the film, and the wavelength or wavelengths emanated from the particular ultraviolet source of radiation being used in the near-visible region. That is to say, thicker films up to thicknesses of 3-5 mils but even more generally 1.5–2.5 mils often will call for a higher critical intensity than thinner films of the same material, as will kinds and proportions of pigments, dyes and mineral fillers, the particular wavelengths of light available from the source in the near-U.V. region, and all those things which tend to absorb or transmit the particular U.V. energy being utilized, as well as the activity of the particular sensitizer system and the inertness of the gas atmosphere towards the film surface. As a practical matter a U.V. sensitizer or sensitizer mixture is used in virtually every film for this photopolymerization.

DESCRIPTION OF THE DRAWING

The drawing is a flow diagram of one simple form of the invention using conventional light sources providing the U.V. energy sequentially as preferred. Conveyor deck 13, traveling from left to right, positions substrate 11 (suitably wood or metal) at position 1. Substrate 11 is coated on its top surface with a film of oxygen-inhibited ultraviolet photopolymerizable resin-forming material 12. The ambient atmosphere surrounding this coating at this position and also at position 2 is air. Conventional flash photolysis light source 15 then is turned on to flash irradiate the top surface of film 12 with U.V. energy depicted as rays 14, this irradiation being effective for forming a tack-free skin superficially over the top of coating 12. Conveyor deck 13 then moves coated workpiece 11 to the right and to position 2 beneath conventional sustained photolysis light source 16. The pre-treated workpiece in position 2 is indicated as item 11', and the thus-pretreated coating thereon as 12'. The rays emanating from the sustained U.V. photolysis source are depicted as item 17. This exposure to sustained irradiation can last from a few milliseconds up to several seconds and is called for convenience herein the "profound phase." It substantially completely polymerizes the remainder of the coating throughout its thickness; the underlying resin-forming material in this instance is protected from polymerization inhibition by virtue of the skin formed over the coating in the earlier or superficial phase of the operation.

When the conveyor deck travel is reversed in direction with the freshly coated workpiece traveling from right to left, then the following occurs: the profound phase substantially completely polymerizes the mass of the film except for inhibition of polymerization at the surface thereof due to the air environment. The thus-treated workpiece is then moved leftwardly and positioned under the flash U.V. photolysis source, and the polymerization of the entire film mass is substantially completed throughout its thickness. In either case the high intensity of the U.V. flash can be used to overwhelm the inhibition to cure.

Obviously multiple flash photolysis light sources can be used if necessary or desirable. Frequently it can be desirable to have two or more of such sources operating in sequence as workpieces travel beneath them on a conveyor. When such flash units are off, they can be cooling effectively and advantageously. Similarly, a plurality of sustained U.V. photolysis sources can be used in a series to provide adequate energy dosage for effecting the profound phase of the film curing. The light sources can use imaging means such as reflectors to direct and concentrate their beams on the films being treated.

Usually the freshly coated workpieces are moved continuously by conveyor under the flash and sustained U.V. units. However, it is conceivable to move or refocus these light sources relative to the workpiece position or to use one conveyor for one phase of the operation and another for the second phase.

Flash photolysis operates extremely rapidly, the irradiation often lasting only 1/1,000 to 1/100,000 of a second, typically about 1/50,000 of a second. The U.V. energy can be quite intense, e.g., up to several watts per square cm. or, advantageously, much higher, e.g., hundreds or thousands, if desired, or it can be of an intensity as low as a few tens of milliwatts per square cm. of the exposed film. Flash photolysis units emitting a fairly continuous spectrum of near-U.V. light energy are available, for example, a xenon gas-containing lamp, from the Xenon Corporation. Usually they are operated off a condenser bank in which is built up a high-voltage electrical charge to light the lamp periodically. Alternatively, a pulsed near-U.V. laser of high output energy, e.g., a nitrogen laser, also can be used. The pulses can be, for example, from 1 to 500 per second and last about a monosecond. Optical means can be used to spread, concentrate, and scan light beams over the work. Sustained photolysis units are designed to irradiate substantially continuously even though they might be using alternating electric current which makes for variable output.

Typically the polymerizable film-forming material can constitute the entire film or be the polymerizable binder for discrete, substantially inert solids and additives therein such as pigments to yield the cured product in the nature of a paint, varnish, enamel, lacquer, filler, stain, ink, or adhesive. Preferably the uncured films are fluent at ordinary irradiation temperature (between about 30°F. and about 300°F. and advantageously between ordinary room temperature and about 180°F.). When polymerized in accordance with this invention, a tack-free film that is durable enough for ordinary handling results rapidly. In the cured state the binder of such film is resinous or polymeric in nature, often crosslinked. Uncured for application to a substrate or uncured on such substrate, such paint consists essentially of a monomer or a mixture of monomers, or a further polymerizable oligomer, prepolymer, resin, or mixture of same, or a resinous material dispersed or dissolved in a solvent that is copolymerizable therewith. Such solvent ordinarily is monomeric, but can be an oligomer (i.e., up to 4 monomer units connected) or prepolymer (molecular weight rarely above about 2,000). Oligomers and prepolymers should be understood herein as being polymeric in nature.

In the main such vehicles or binders are those which also are conventionally polymerizable by free-radical-induced addition polymerization using peroxy or azo catalysis or a redox system. Alternatively, however, the binders can be a fluent material wherein the ultraviolet wave energy causes photochemical generation of a catalytic material or effects a rearrangement which starts a polymerization that continues until a usefully polymerized deposit results. The useful vehicles can be polymeric, monomeric, or a mixture, especially those exhibiting polymerizable vinyl, acrylic, allylic, mercaptan, fumaric, maleic, or like unsaturated functionality. Reactive polymeric types include unsaturated polyesters, acrylics, epoxies, urethanes, and silicones. Representative polymeric vehicles include those derived from the reaction of dibasic acids or their anhydrides with polyols. For example, equimolar amounts of maleic anhydride and phthalic anhydride can be condensed with propylene glycol in slight excess to form an unsaturated polyester which can be diluted with styrene to a sirup of resin solids, generally between 40 and 80 percent n.v. The polyester resin thus prepared has an acid number of about 60 and less. Fumaric acid can be substituted for the maleic anhydride. Similarly, propylene oxide can be substituted for the major portion of propylene glycol. Also instead of styrene other copolymerizable monomers such as hydroxyethylacrylate can be used.

Other useful types for curing include trimethylolpropane triacrylate, pentaerythritol triacrylate, ethyleneglycol diacrylate, diacrylic acid adduct of the diglycidyl ether of bisphenol A (DER 332 diacrylate), a di- or tri-isocyanate reacted with a hydroxy-containing acrylate such as hydroxyethyl or hydroxypropyl acrylate.

Reactive monomer types include a variety of acrylates such as hydroxyethyl, cyclohexyl, hydroxypropyl, 2-ethylhexyl, benzyl, phenoxyethoxy, lower alkoxyethoxy, tetrahydrofurfuryl, and similar acrylates, and also N-vinyl pyrrolidone, vinyl acetate, vinyl acetatebutyrate, styrene and substituted styrenes. The most popular curable film binders for treatment in accordance with the instant invention contain at least one polymerizable ethylenically unsaturated group of the structure:

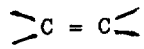

Sensitizer types useful in promoting U.V. polymerization of the film in accordance with the instant invention include the types: chlorosulfonated polynuclear ketones blended with alphahaloalkylated polynuclear ketones; chlorosulfonated benzanthrones blended with alpha-haloalkylated benzanthrones; chlorosulfonated fluorenones plus alpha-haloalkylated fluorenones; carbonylated phenyl nuclear sulfonyl chlorides; and carbonylated polynuclear sulfonyl chlorides as shown in the copending U.S. Pat. applications of Vincent R. McGinniss, Ser. Nos. 323031, 323087, 323032, and 323086, respectively, expressly incorporated herein by reference. Other sensitizers that are conventional can be used alone or in admixture with the foregoing ones, for example, benzoin, benzoin ethers, oxime ethers, and phosphines. While the speed of U.V. curing is quite remarkable using the present invention technique, the depth of cure also is usually quite practical so that the resulting polymerized deposit not only is tack-free, but also resists scratching or disruption when first ostensibly tack-free. Curing can continue on stored pieces. Typically substrate work-pieces coated with the uncured paint deposit or deposits are passed transversely to the U.V.-providing light beam by a conveyor. The substrate being coated can be metal, mineral, glass, wood, paper, plastic, fabric, ceramic, etc.

Many useful pigments can be incorporated, in modest proportions, into the vehicle without much deleterious effect. Thus, opacifying pigments such as zinc oxide can be used quite well. Titania, e.g., anatase and particularly rutile, makes for a much more difficult film to cure by U.V. radiation, but such opacifying pigmentation can be used. Other filler materials and coloring pigments such as basic lead sulfate, magnesium silicate, silica, clays, wollastonite, talcs, mica, chromates, iron pigments, wood flour, microballoons, hard polymer particles, and even reinforcing glass fiber or flake also are suitable in the vehicle to make a paint. Ordinarily it is most desirable to use pigments which do not absorb a great deal of U.V. wavelength in the same region of the U.V. spectrum as is absorbed by the U.V. sensitizer. However, by use of adjunct energy-transferring, U.V.-sensitizing materials such as Michler's ketone in the sensitizing mixture, sufficient energy transfer often can be obtained to activate sensitizers such as the carbonylated phenyl nuclear sulfonyl chloride types and enhance the curing of pigmented systems. The wavelength of the U.V. source should not be too similar to or close to the wavelength absorbed by the pigment in the U.V. range for best advantage of the irradiation process. Pigmented or filled films for the process preferably are no more than about a mil thick and generally about 0.1–0.5 mil thick maximum, for efficiency and economy of curing.

In this specification, unless otherwise expressly indicated, all parts are parts by weight, all percentages are weight percentages, and all temperatures are in degrees Fahrenheit.

The superficial phase of this curing operation merely polymerizes the resin-forming material into a protective skin which is either sufficient to substantially complete polymerization of the mass when it has been treated in the profound phase previously or to protect the less-fully polymerized resin-forming material therebelow from polymerization inhibition when said superficial phase is the first one to be performed. The superficial phase and the profound phase are, of course, susceptible to being divided up into a series of "subsuperficial" and "subprofound" phases, each of said series acting simultaneously or sequentially to perform a complete superficial phase or a complete profound phase collectively. The profound or in-depth curing phase will substantially complete polymerization throughout the mass, except for the top surface thereof exposed to oxygen inhibition or previously skinned-over by the superficial phase of the irradiation. The superficial phase will form the "skin" at the top surface and effect minor polymerization into the depth of the film, perhaps affecting only 10-40 percent of the film depth by way of polymerization to some appreciable degree.

The following example shows how my invention can be practiced, but should not be construed as limiting the invention.

EXAMPLE

Paint compounded as follows is applied at 1 mil wet thickness to an aluminum panel 1 inch by 1 inch. This paint is air-inhibited and when irradiated by the sustained U.V. energy in accordance with the second step of the example, it will yield a film having a tacky surface.

| Component | Parts by Weight |
| --- | --- |
| The reaction product of 1 mol of isophorone diisocyanate and 2 mols of hydroxyethylacrylate | 40 |
| Hydroxyethylacrylate | 25 |
| 2-phenoxyethylacrylate | 15 |

-Continued

| Component | Parts by Weight |
| --- | --- |
| Melamine acrylate | 15 |
| Sensitizing mixture: | |
| Benzophenone | 2 |
| Methyldiethanolamine | 1 |

The freshly coated side of the panel is subjected to irradiation from a Xenon Corporation flash photolysis lamp operating to emit a substantially continuous spectrum of U.V. energy in the 2,000-4,000 A range of wavelength. The gap of atmospheric air at room temperature between the lamp and the panel is about 4 inches. The lamp emits such energy for up to about 1/1,000 second.

The lamp is about 8 inches long and 10 mm. in diameter and housed in an elongated housing of essentially square cross section that is black inside. The U.V. light is emitted from a 1-inch diameter exit port about 1 inch in front of the lamp surface and mid-way to the length of the lamp tube. The power supply is 400 volts d.c. charging a bank of 10 capacitators parallel, each of 100 microfarads rating. The housing acts poorly as a reflector; it is estimated that about ½ to 1 Joule of near-U.V. energy per flash is the near-U.V. light output through such exit port.

A superficial top surface cure results on the paint of the panel struck by the flash of U.V. energy. This area of the paint is non-tacky to the touch, but examination shows that the film is soft and decidedly underpolymerized slightly below its surface and further to its bottom. The thus-treated panel then is passed, paint-side-up, by conveyor successively under a pair of like commercial mercury vapor lamps in parallel array and designed for emitting near-U.V. energy. These lamps are Hanovia model No. 652-OA431 U.V. lamps having a 4,000-watt demand, and they are 20 inches long. Each is equipped with an efficient reflector. The conveyor travel is normal to the axis of said lamps and 6 inches below said lamps at the rate of about 100 feet per minute. Air is the atmosphere between lamps and panel. The result is a fully cured (substantially completely polymerized throughout) paint film having excellent adhesion, gloss, and resistance for its type.

We claim:

1. In combination with an ultraviolet photopolymerizable material, an apparatus for irradiating a mass of said material located within an irradiation area and disposed within an air-inhibited atmosphere comprising:
   a first ultraviolet light source for irradiating said material within said irradiation area, said first source being a flash photolysis light source emitting pulse irradiation whereby said material is cured superficially;
   a second ultraviolet light source for irradiating said material within said irradiation area, said second source being a sustained photolysis light source emitting substantially continuous ultraviolet light whereby said material is profoundly cured.

2. The apparatus in claim 1 wherein said first source emits between about 1 to 500 pulses per second, each said pulse irradiating between about 1/1,000 to 1/100,000 of a second.

3. The apparatus of claim 1 wherein said first source irradiates simultaneously with said second source.

4. The apparatus of claim 1 wherein said first source irradiates sequentially with said second source.

* * * * *